(12) United States Patent
Wang et al.

(10) Patent No.: US 11,086,836 B2
(45) Date of Patent: Aug. 10, 2021

(54) INDEX LEAF PAGE SPLITS AVOIDANCE OR REDUCTION

(71) Applicant: International Business Machines Corporation, Armonk, NY (US)

(72) Inventors: Xiaobo Wang, Beijing (CN); Shuo Li, Beijing (CN); ShengYan Sun, Beijing (CN); Hong Mei Zhang, Beijing (CN); Ping Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 16/520,707

(22) Filed: Jul. 24, 2019

(65) Prior Publication Data

US 2021/0026824 A1    Jan. 28, 2021

(51) Int. Cl.
*G06F 16/22* (2019.01)

(52) U.S. Cl.
CPC ...... *G06F 16/2246* (2019.01); *G06F 16/2272* (2019.01)

(58) Field of Classification Search
CPC ............ G06F 16/2228; G06F 16/2246; G06F 16/2272; G06F 16/23
See application file for complete search history.

(56) References Cited

U.S. PATENT DOCUMENTS

| | | | |
|---|---|---|---|
| 4,956,774 A * | 9/1990 | Shibamiya | G06F 16/9017 |
| 7,299,243 B2 * | 11/2007 | Maxfield | G06F 16/284 |
| 7,650,352 B2 * | 1/2010 | Fuh | G06F 16/2365 707/696 |
| 8,682,872 B2 | 3/2014 | Bright | |
| 9,576,004 B1 | 2/2017 | Li et al. | |
| 10,169,391 B2 | 1/2019 | Fang et al. | |
| 2011/0145255 A1 | 6/2011 | Kim et al. | |
| 2011/0246503 A1 * | 10/2011 | Bender | G06F 16/258 707/769 |
| 2016/0306834 A1 * | 10/2016 | Li | G06F 16/2272 |

(Continued)

FOREIGN PATENT DOCUMENTS

CN    102929979 A  *  2/2013

OTHER PUBLICATIONS

Cioloca et al., "Increasing Database Performance Using Indexes", Database Systems Journal, vol. II, No. Feb. 2011, pp. 13-22, <http://www.dbjournal.ro/archive/4/2_Ciologa_Georgescu.pdf>.

(Continued)

*Primary Examiner* — James E Richardson
(74) *Attorney, Agent, or Firm* — Edward J. Wixted, III

(57) ABSTRACT

In an approach, a processor receives a first request to store a specific key to index pages of a database, wherein: the request indicates that the specific key is to be stored to a specific leaf page in a key-ordered chain of the index pages, and there is insufficient room in the specific leaf page to store the specific key. A processor determines at least one sibling leaf page of the specific leaf page in the key-ordered chain, the specific leaf page and the at least one sibling leaf page forming a first set. A processor determines that there is enough room in leaf pages of the first set to store existing keys in the leaf pages of the first set together with the specific key. A processor stores the existing keys in the leaf pages of the first set together with the specific key according to a redistribution policy.

17 Claims, 9 Drawing Sheets

(56) References Cited

U.S. PATENT DOCUMENTS

| | | | |
|---|---|---|---|
| 2017/0116246 A1* | 4/2017 | Fang | G06F 16/2272 |
| 2017/0228449 A1* | 8/2017 | Cui | G06F 16/221 |
| 2017/0351721 A1 | 12/2017 | le Mar | |
| 2018/0067974 A1 | 3/2018 | Fang et al. | |
| 2018/0268010 A1 | 9/2018 | Park et al. | |
| 2018/0300350 A1* | 10/2018 | Mainali | G06F 16/134 |

OTHER PUBLICATIONS

IBM, "Index Splitting for sequential INSERT activity", IBM Knowledge Center, Printed Jun. 12, 2019, 3 pages, <https://www/ibm.com/support/knowledgecenter/en/SSEPEK_10.0.0/perf/srd/tpc/db2z_indexsplit4seqinsert.html>.

Mell et al., "The NIST Definition of Cloud Computing", Recommendations of the National Institute of Standards and Technology, Special Publication 800-145, Sep. 2011, 7 pages.

* cited by examiner

INDEX LEAF PAGE SPLITS AVOIDANCE OR REDUCTION

BACKGROUND

Embodiments of the present disclosure relate to the field of computer databases and more particularly to avoiding or reducing index page splits when inserting a key or a plurality of keys into an index in a relational database.

Database systems are widely used in various fields. Relational databases, as a major type of computer databases, organize data into tables of rows and columns. One common relational database management system (DBMS) is the DB2® database system marketed by International Business Machines Corporation (IBM). (DB2 is a registered trademark of IBM.)

Relational databases typically store indices in addition to the actual data stored in the tables of a database. Indices are typically implemented as B tree or B+ tree, with the actual index data stored in leaf nodes in the B tree or B+ tree. These indices allow efficient access to desired data in the database.

SUMMARY

Aspects of an embodiment of the present invention disclose a method, computer program product, and computer system. A processor receives a first request to store a specific key to index pages of a database, wherein: the request indicates that the specific key is to be stored to a specific leaf page in a key-ordered chain of the index pages; the specific leaf page is in memory; and there is insufficient room in the specific leaf page to store the specific key. A processor determines at least one sibling leaf page of the specific leaf page in the key-ordered chain, the specific leaf page and the at least one sibling leaf page forming a first set. A processor determines that there is enough room in leaf pages of the first set to store existing keys in the leaf pages of the first set together with the specific key. Responsive to determining that there is enough room in the leaf pages in the first set to store the existing keys in the leaf pages of the first set together with the specific key, a processor stores the existing keys in the leaf pages of the first set together with the specific key by redistributing the existing keys in the leaf pages of the first set together with the specific key among the leaf pages of the first set according to a redistribution policy.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
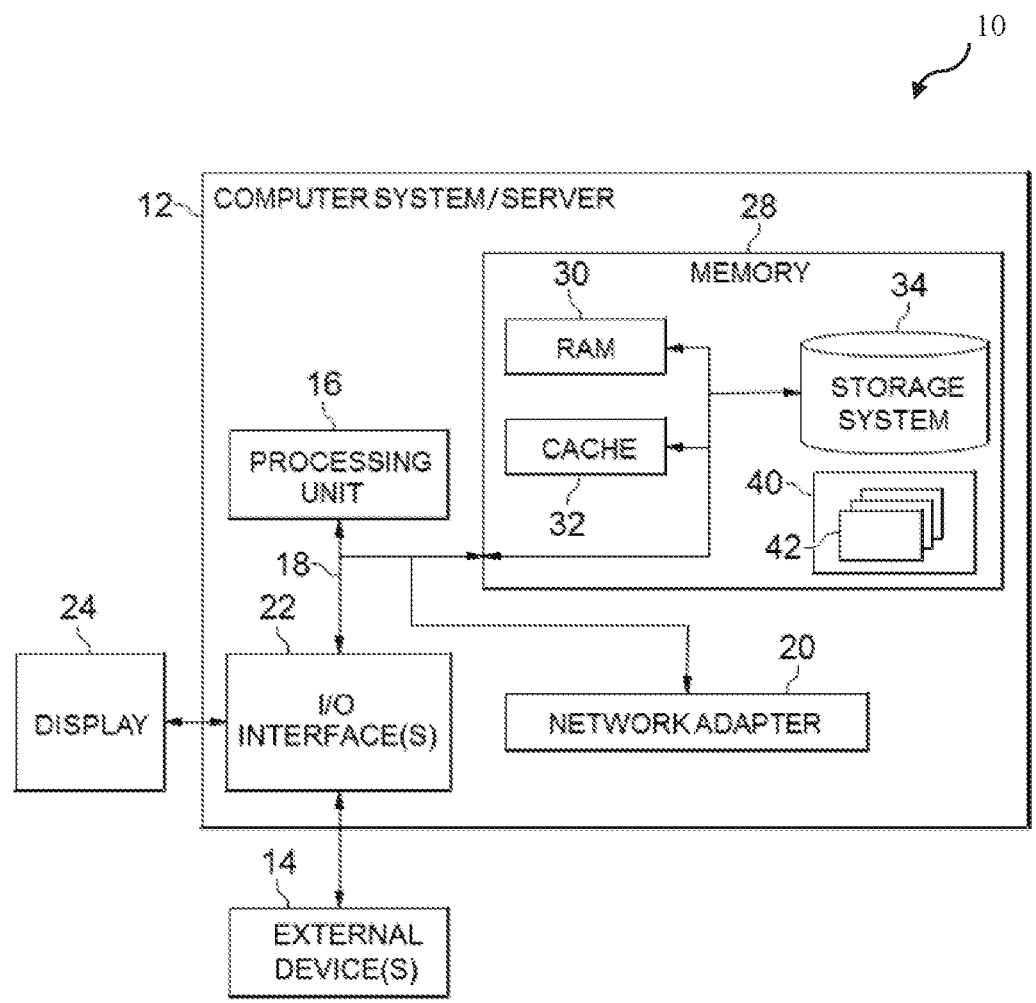
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
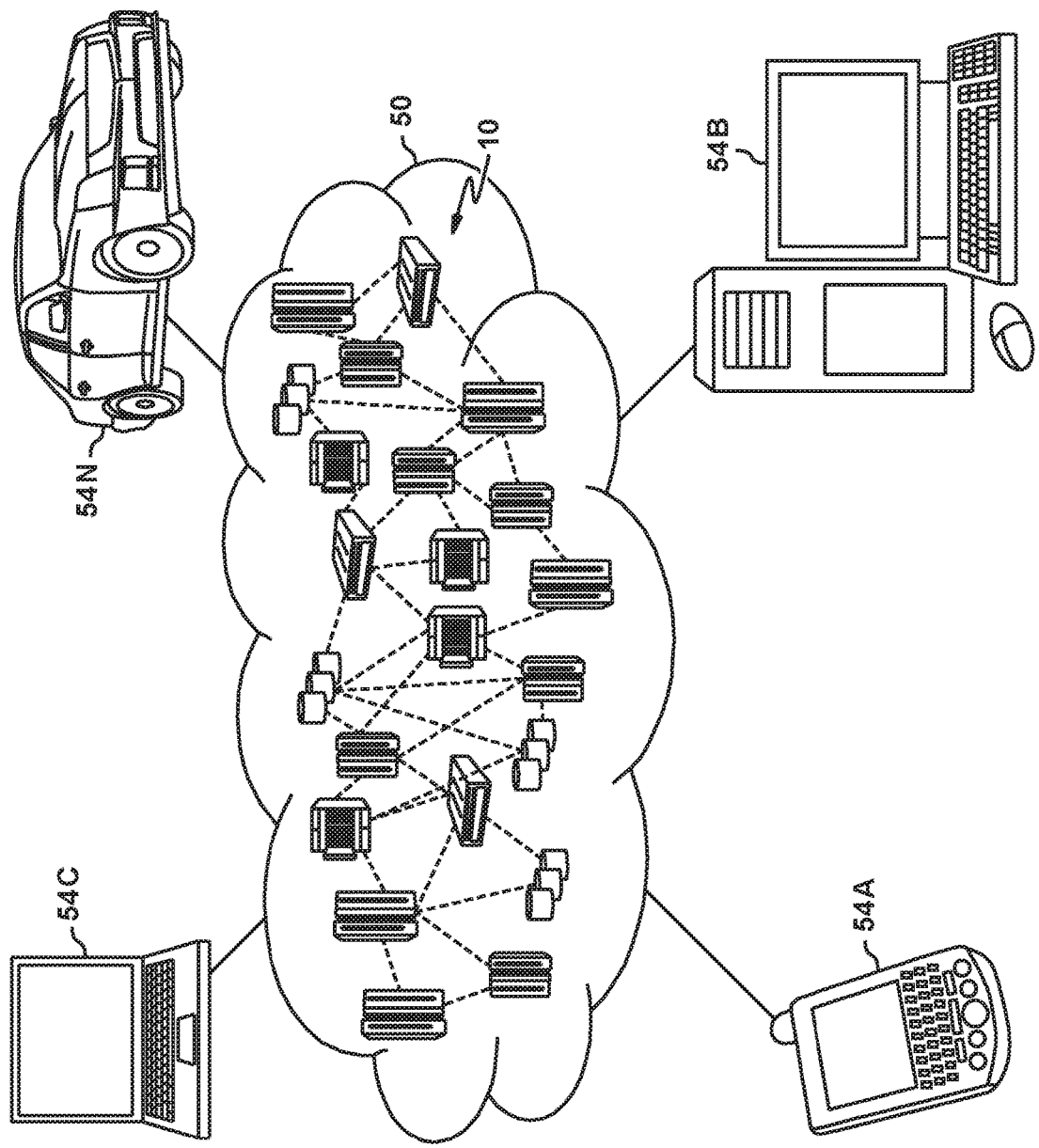
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
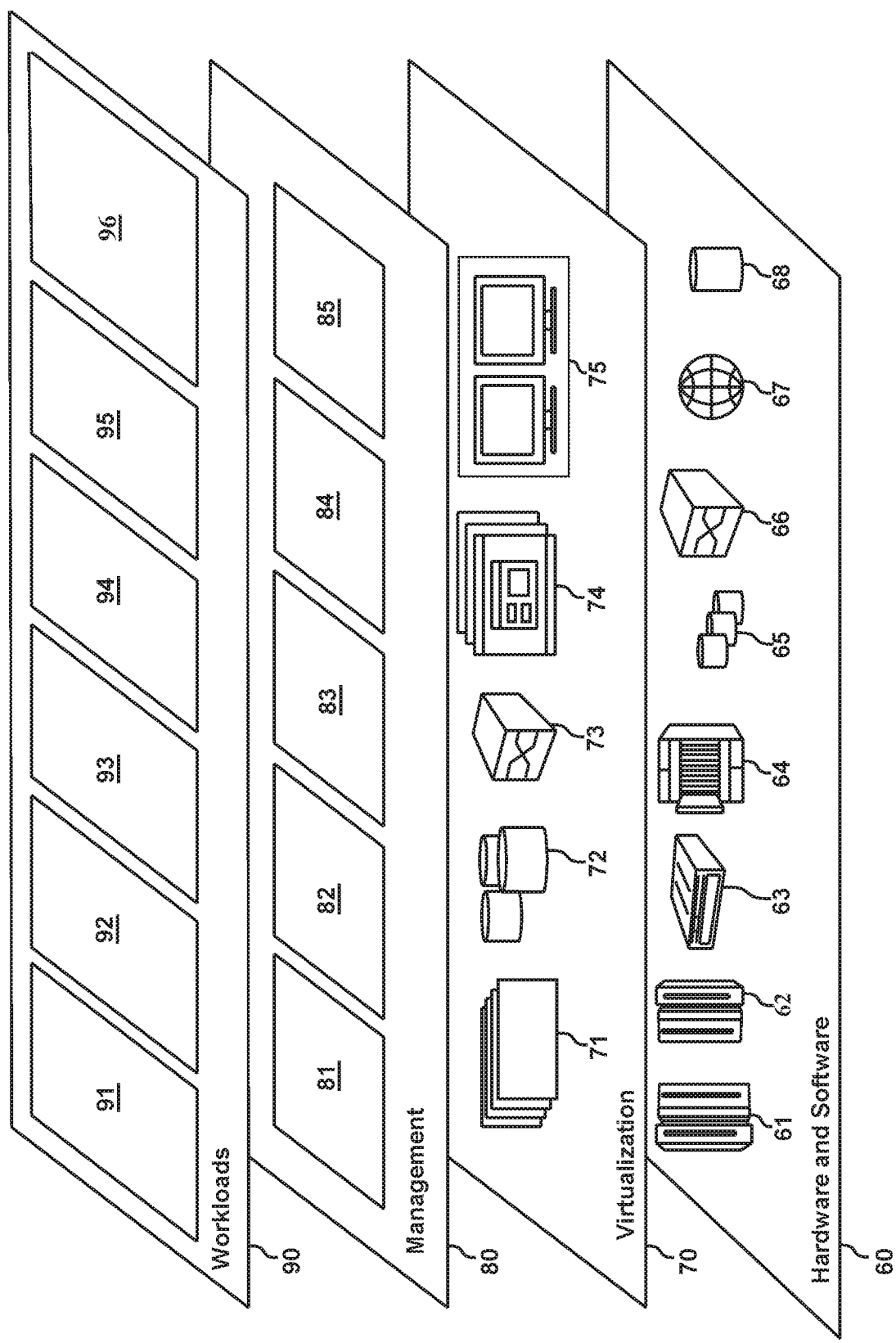
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and index managing 96.

Figure 4:
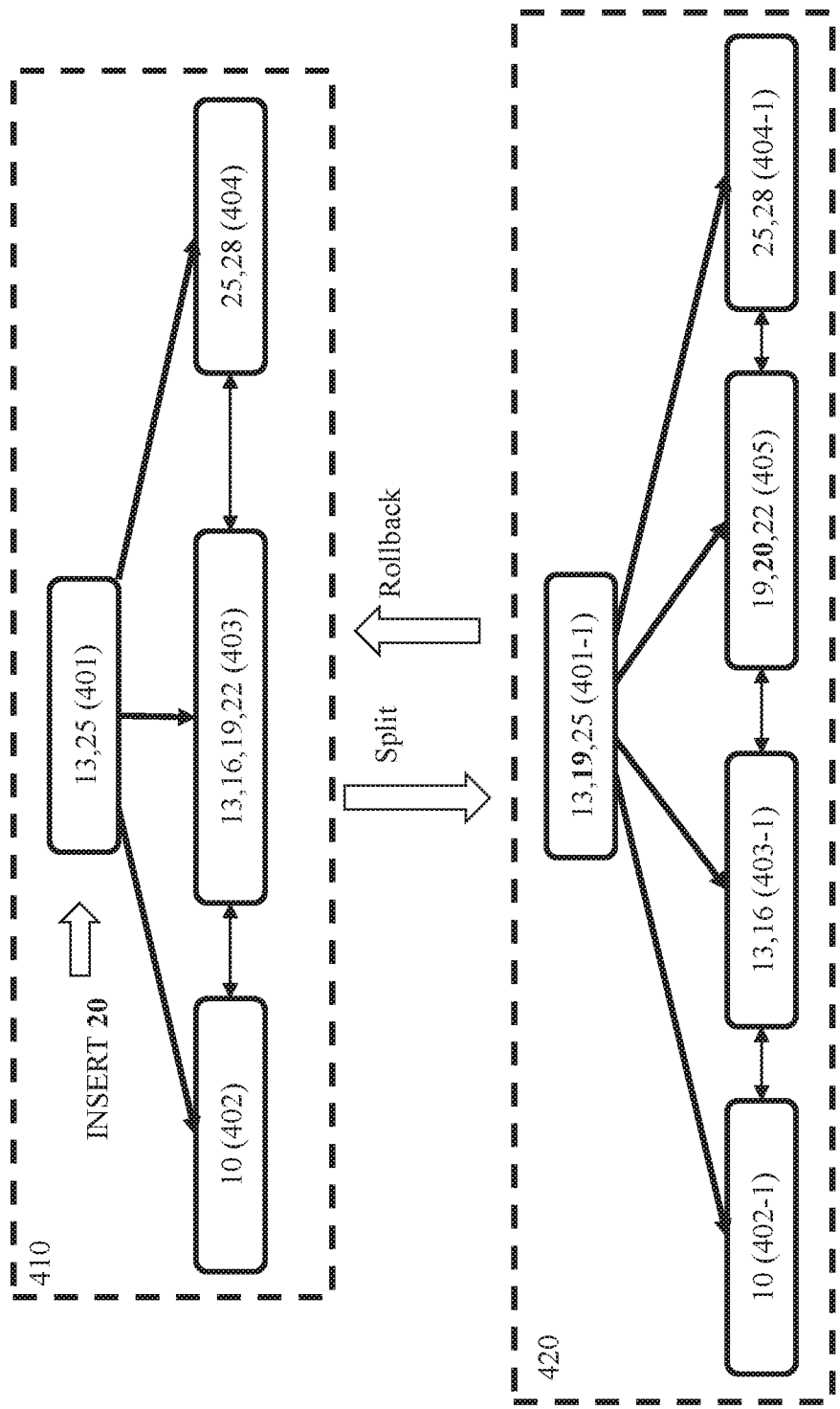
FIG. 4 depicts a partial B+ tree structure of a first example index, and its corresponding split B+ tree structure of the first example index when inserting a key into the first example index.

FIG. 4 depicts a partial B+ tree structure 410 of a first example index, and its corresponding split B+ tree structure 420 of the first example index when inserting a key with a value of 20 into the first example index. As shown in FIG. 4, the partial B+ tree structure 410 of the example index comprises three leaf pages 402, 403 and 404, and their parent page 401 which is a non-leaf page. A group of keys and associated data are stored in each leaf page of the partial B+ tree 410. Typically, a leaf page is kept in a fixed size such as 4 KB. Each non-leaf page contains a group of index keys, which are sequentially ordered. The order may be either in ascending key value order or in descending key value order. In the example index of FIG. 4, the leaf page 402 contains index key with a value of 10 and associated data (not shown in FIG. 4), the leaf page 403 contains index keys with values of 13, 16, 19 and 22, respectively, and associated data (not shown), the leaf page 404 contains index keys with values of 25 and 28 and associated data (not shown). All these three leaf pages are in ascending key value order. The non-leaf page 401 just stores sequentially ordered key values, e.g. 13 and 25, as well as pointers associated to the ordered key values. The number 13 corresponds to a key value 13 in the leaf page 403. The key value 13 is the smallest key value in the leaf page 403. It is greater than any keys in value in the leaf pages 402. A pointer associated to the key value 13 points to the leaf page 402. Similarly, a pointer associated to the key value 25 points to the leaf page 403. Besides, the leaf pages 402, 403 and 404 are linked together in the index with two leaf-page chain pointers, one pointing to successor leaf page and another pointing to predecessor leaf page, allowing easy traversal of the leaf-page chain in either direction to search the index more efficiently. In such a leaf-page chain, each leaf page has keys that are higher in value than the keys in the previous leaf pages. For example, the keys with values of 25 and 28 in the leaf page 404 are higher in value than the keys with values of 13, 16, 19 and 22 in the leaf page 403. The maximum number of keys contained in a leaf page is typically predefined when the B+ tree index is built, such as four in the example index shown in FIG. 4. In other words, if there are already four keys in a leaf page in the partial B+ tree structure 410 in FIG. 4, the leaf page is full. If a new key were to be inserted into the leaf page, there would be no empty slot in the leaf page for the new key. Therefore, the leaf page has to be split to make room for accommodating the new key.

For example, when a record data comprising a key with a value of 20 is inserted into a table with the above index, the insertion of the record data into the database results in an insertion of the key with the value of 20 into a leaf page in the index. The insertion must preserve the sequential ordering of keys in value in the leaf pages. The key with the value of 20 needs to be inserted into the leaf page 403. However, the leaf page 403 is full, thus the key with the value of 20 cannot be inserted into an existing leaf page in correct sequential order because there is no empty slot to insert the key on the leaf page 403. A page split is typically performed to make room for the key with the value of 20. Typically, the page split is performed by splitting a leaf page in half, keeping the first half of leaf page in place, and moving the second half of leaf page to the new leaf page. In this example, the leaf page 403 is split into two leaf pages, e.g. a leaf page 403-1 and a leaf page 405 as shown in a split B+ tree structure of the first example index indicated by a reference number 420 in FIG. 4. The leaf node 403-1 contains two index keys (with values of 13 and 16 respectively) and associated data (not shown), the leaf node 405 contains three index keys (with values of 19, 20 and 22 respectively) and associated data (not shown). The keys stored in the non-leaf page 401 of the split B+ tree structure 420 of the first example index are also updated to comprise the highest key with a value of 19 in the leaf page 403 (not included).

As discussed above, insertions of keys into leaf pages may cause page splits. Page splits tend to be expensive, because logs must be first written to permanent storages such as disks in order to avoid rollback errors when pages are split. The operation of writing log needs a synchronize I/O operation, which is one of the factors that most impacts the performance of the insertion operation, as insertion operations of other data records have to be suspended to wait for the completion of the synchronization I/O.

Thus, it is necessary to avoid page splits, or reduce the frequency of page splits in a database management system (DBMS).

Embodiments of the present invention recognize that when one or more new keys are inserted into the leaf-page chain, where the leaf-page chain comprises a plurality leaf pages, if all keys in the plurality leaf pages in addition to the one or more new keys are redistributed within the plurality of the leaf pages without page splits, the synchronization I/O is not needed. Instead, an asynchronous I/O can be used, and insertion operations for other data records need not to be suspended. Thus, the cost of page splits can be avoided. Even if page splits cannot be avoided, if page split frequency can be reduced, the cost of page splits can be reduced too. Technologies provided in some embodiments of this invention may reduce page splits in frequency and even avoid page splits.

In the following description, that keys are inserted into leaf pages means inserting the keys into the leaf pages at the indicated locations of an index in a database. Although the database management system (DBMS) of the database also inserts data records into the database that correspond to the keys inserted into the leaf pages, the procedure for inserting the data records corresponding to the keys is outside the scope of the present invention and is not further described herein. Further, it will be understood that key entries in the leaf pages typically contain data other than the key itself. Reference to a key therefore should be understood to refer to the key itself and any associated data. The structure and other associated contents of the key entry are outside the scope of the present invention and are not further described herein. In addition, the leaf pages corresponding to the keys in a B+ tree index illustrated herein are shown with a small number of entries for clarity of the drawings.

Insertion operations for a table include inserting a record data to the table or inserting a plurality of records' data to the table. The operation of inserting the record data to the table results in an operation of inserting a key into a leaf page of an index B+ tree of the table, and the operation of inserting the plurality of records' data to the table may result in an operation of inserting a plurality of keys into a plurality of leaf pages of the index B+ tree of the table. Embodiments of the invention try to avoid page splits or reduce page splits in frequency for both scenarios.

Figure 5:
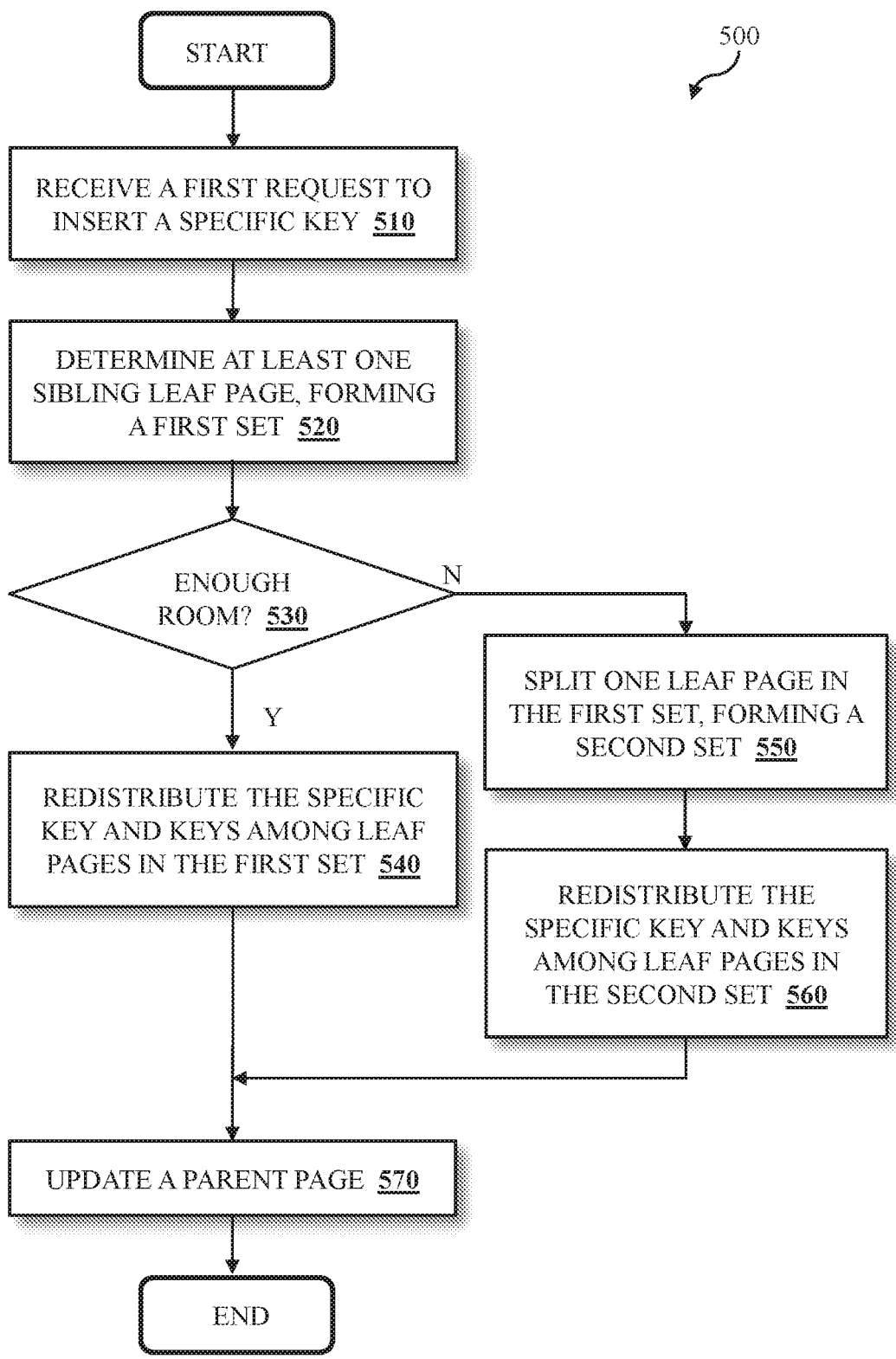
FIG. 5 depicts a schematic flowchart of a method for inserting a specific key to index pages of a database according to an embodiment of the present disclosure.
Figure 6:
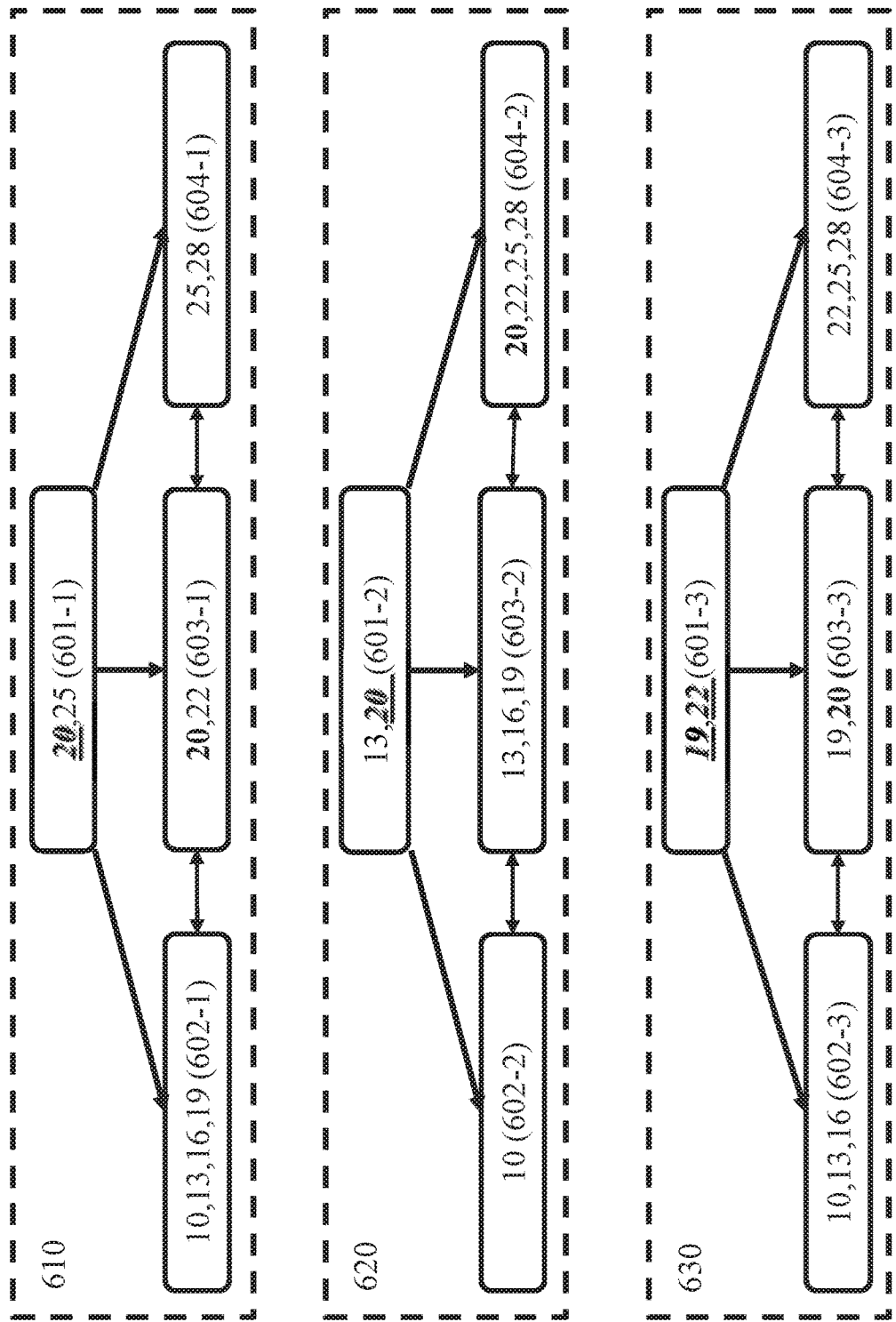
FIG. 6 depicts three results of keys redistribution for the partial B+ tree structure shown in FIG. 4.

FIG. 5 depicts a schematic flowchart of a method 500 for inserting a specific key to index pages of a database according to an embodiment of the present disclosure. FIG. 6 depicts three results of key redistribution for the partial B+ tree structure 410 shown in FIG. 4. The implementation of the method 500 is specifically described in conjunction with FIG. 4 and FIG. 6.

Referring to FIG. 5, at step 510, a first request is received to store a specific key to index pages of a database, wherein the specific key is to be stored into a specific leaf page in a key-ordered chain of the index pages, and wherein the specific leaf page is in memory and there is no room in the specific leaf page to store the specific key. For example, As shown in FIG. 4, the first request is to store the key with a value of 20 to the leaf page 403 which contains four keys and there is no empty slot in the leaf page 403 to store the key.

At step 520, at least one sibling leaf page of the specific leaf page in the key-ordered chain can be determined, wherein the specific leaf page and the at least one sibling leaf page form a first set. It should be understood that the at least one sibling leaf page and the specific leaf page have adjacent relationships. The adjacent relationships are logical relationships, and do not assume any spatial relationships or physical layouts in an implementation example. An embodiment may implement leaf pages such that they are logically adjacent, but physically separated by other data when stored in memory or on disks.

In some embodiments, a leaf page can be determined to be a sibling leaf page of the specific leaf page if the leaf page satisfies three criterions. (1) The leaf page shares the same parent page with the specific leaf page. For example, the leaf pages 402 and 404 share the same parent page (page 401) with the specific leaf page 403, so the leaf pages 402 and 404 can be sibling leaf page candidates of the leaf page 403. (2) The leaf page is in memory. If the leaf page is not in the memory, the method has to load it from storages such as disks to the memory, then a synchronize I/O operation is needed which is expensive and results in database performance degradation. (3) The leaf page is not locked. If the leaf page is locked, it means other users are accessing the leaf page, so the leaf page and keys stored in the leaf page cannot be moved or changed.

Referring back to FIG. 4, it is assumed that in FIG. 4, the leaf pages 402 and 404, as the sibling leaf page candidates of the leaf page 403, are in the memory and are not locked. Thus, the leaf pages 402 and 404 can be determined to be the sibling leaf pages of the leaf page 403. For the convenience of description, the leaf pages 402, 403 and 404 together can be regarded as a first set.

In some embodiments, the at least one sibling leaf page can be traced in an ascending key value order in the key-ordered chain of index pages, in a descending key value order in the key-ordered chain of index pages, or in both. In some embodiments, the number of the at least one sibling leaf page can be predefined by a database administrator to avoid redistributing too many leaf pages in a next step.

At step 530, whether there is enough room in all leaf pages in the first set to store existing keys in all leaf pages in the first set together with the specific key can be determined. Referring to FIG. 4, room in the leaf pages 402, 403 and 404 in the first set is 4*3=12 slots, which is enough to store the eight keys {10, 13, 16, 19, 20, 22, 25, 28} in the leaf pages 402, 403 and 404. In some embodiments, the steps 520 and 530 can be executed together, e.g. when the leaf pages sharing the same parent page with the specific leaf page are determined to be the at least one sibling leaf page one by one, the first set is iteratively updated one by one accordingly. When the first set is updated in an iteration, it is determined whether there is room in leaf pages in the first set large enough to store the specific key and keys in the at least one sibling leaf page are determined. Once there is enough room, the iteration is stopped and the final first set is determined. In this way, the computing resources for the at least sibling leaf page can be reduced.

At step 540, responsive to determining that there is enough room in all leaf pages in the first set to store existing keys in all leaf pages in the first set together with the specific key, the existing keys in all leaf pages in the first set together with the specific key can be stored by redistributing the existing keys in all leaf pages in the first set together with the specific key among all leaf pages in the first set according to a redistribution policy without page splits. Then the method goes to step 570.

In some embodiments, the redistribution policy may specify that the existing keys in all leaf pages in the first set together with the specific key are redistributed evenly among all leaf pages in the first set. In some embodiments, each leaf page in the first set is assigned a weight, and the redistribution policy may specify that the existing keys in all leaf pages in the first set together with the specific key are redistributed among all leaf pages in the first set based on the weight of each leaf page. For example, the redistribution policy may specify that a leaf page with greater weight stores less keys than a leaf page with smaller weight.

In some embodiment, an access frequency of each leaf page is counted. The access frequency for a leaf page can be defined as times keys in the leaf page are accessed during a predefined time. The redistribution policy may consider that the higher the access frequency of a leaf page, the more possible incoming keys to be inserted into the leaf page. So, the leaf page with the higher access frequency needs more empty slots and should store less keys. On the contrary, the lower the access frequency of a leaf page, the less possible incoming keys to be inserted into the leaf page. Therefore, the leaf page with the lower access frequency needs fewer empty slots and should store more keys. Thus, the redistribution policy specifies that a leaf page with higher access frequency stores less keys than a leaf page with lower access frequency.

By way of example, it is assumed that the access frequency of the leaf pages 402, 403 and 404 of the partial B+ tree structure 410 in FIG. 4 are 1, 10 and 8 respectively in a first example, a first redistribution result indicated by a reference number 610 in FIG. 6 shows that the number of keys in the leaf pages 602-1, 603-1 and 604-1 corresponding to the leaf pages 402, 403 and 404 are 4 (keys with values of 10, 13, 16 and 19), 2 (keys with values of 20 and 22), and 2 (keys with values of 25 and 28) respectively. It is assumed that the access frequency of the leaf pages 402, 403 and 404 of the partial B+ tree structure 410 in FIG. 4 are 15, 6, and 1 respectively in a second example, a second redistribution result indicated by a reference number 620 in FIG. 6 shows that the numbers of keys in the leaf pages 602-2, 603-2 and 604-2 corresponding to the leaf pages 402, 403 and 404 are 1 (key with a value of 10), 3 (keys with values of 13, 16 and 19), and 4 (keys with values of 20, 22, 25, 28). It is assumed that the access frequency of the leaf pages 402, 403 and 404 of the partial B+ tree structure 410 in FIG. 4 are 5, 12 and 5 respectively in a third example. A third redistribution result indicated by a reference number 630 in FIG. 6 shows the numbers of keys in the leaf pages 602-3, 603-3 and 604-3 corresponding to the leaf pages 402, 403 and 404 are 3 (keys with values of 10, 13 and 16), 2 (keys with values of 19 and 16 and 20), and 3 (keys with values of 22, 25 and 28) respectively. Using the above method, it can be understood that page splits are avoided when the key with a value of 20 is inserted into the example index B+ tree of FIG. 4.

At step 550, responsive to determining that there is not enough room in all leaf pages in the first set to store the existing keys in all leaf pages in the first set together with the specific key, one leaf page in the first set is split into two leaf pages, wherein the two leaf pages and all leaf pages except the one leaf page in the first set can form a second set. The leaf page to be split can be any leaf page in the first set. For example, the leaf page 403 in the partial B+ tree structure 410 is split into two leaf pages 403-1 and 405 as indicated by the partial B+ tree structure 420 in FIG. 4. Then the leaf pages 402-1, 403-1, 405, and 404-1 form the second set.

In some DBMSs, a percentage of leaf pages that should remain empty are allowed to be specified for potential future insertion processing. In some embodiments, this percentage of free space on pages on which keys are inserted by splitting multiple leaf pages in the first set may be attempted to maintain at step 550.

At step 560, the existing keys in all leaf pages in the first set together with the specific key are stored by redistributing the existing keys in all leaf pages in the first set together with the specific key among all leaf pages in the second set according to the redistribution policy. Here the redistribution policy can be used to the leaf pages in the second set. For example, it is assumed that the access frequencies of the leaf pages 402, 403 and 404 are 1, 10 and 8 respectively, as indicated by the partial B+ tree 410 in FIG. 4, the keys with values of 13 and 16 are stored into the leaf page 403-1, and the keys with values of 19, 20 and 22 are stored into the leaf page 405 which is split from the leaf page 403. The leaf page 403-1 and 405 are frequently accessed, and there are more empty slots for incoming keys to be inserted. When an incoming key is to be inserted into both leaf pages, it is very likely to insert the incoming key without page splits. Therefore, it can be understood that although page splits cannot be avoided in this scenario, the redistribution of keys make it possible to avoid page splits when an incoming key is inserted into the partial index B+ tree of FIG. 4, thus the DBMS can benefit from this method. Then the method goes to step 570.

At step 570, keys and pointers stored in a parent page of the specific leaf page are updated. As indicated in 610 of FIG. 6, the original key with values of 13 together with a pointer pointing to the leaf page 402 and the original key with a value of 25 together with a pointer pointing to the leaf page 403 in the parent page 401 in FIG. 4 are updated to be the key with the value of 20 together with a pointer pointing to the leaf page 602-1 and the key with the value of 25 together with a pointer pointing to the leaf page 603-1 in the parent page 601-1.

Figure 7:
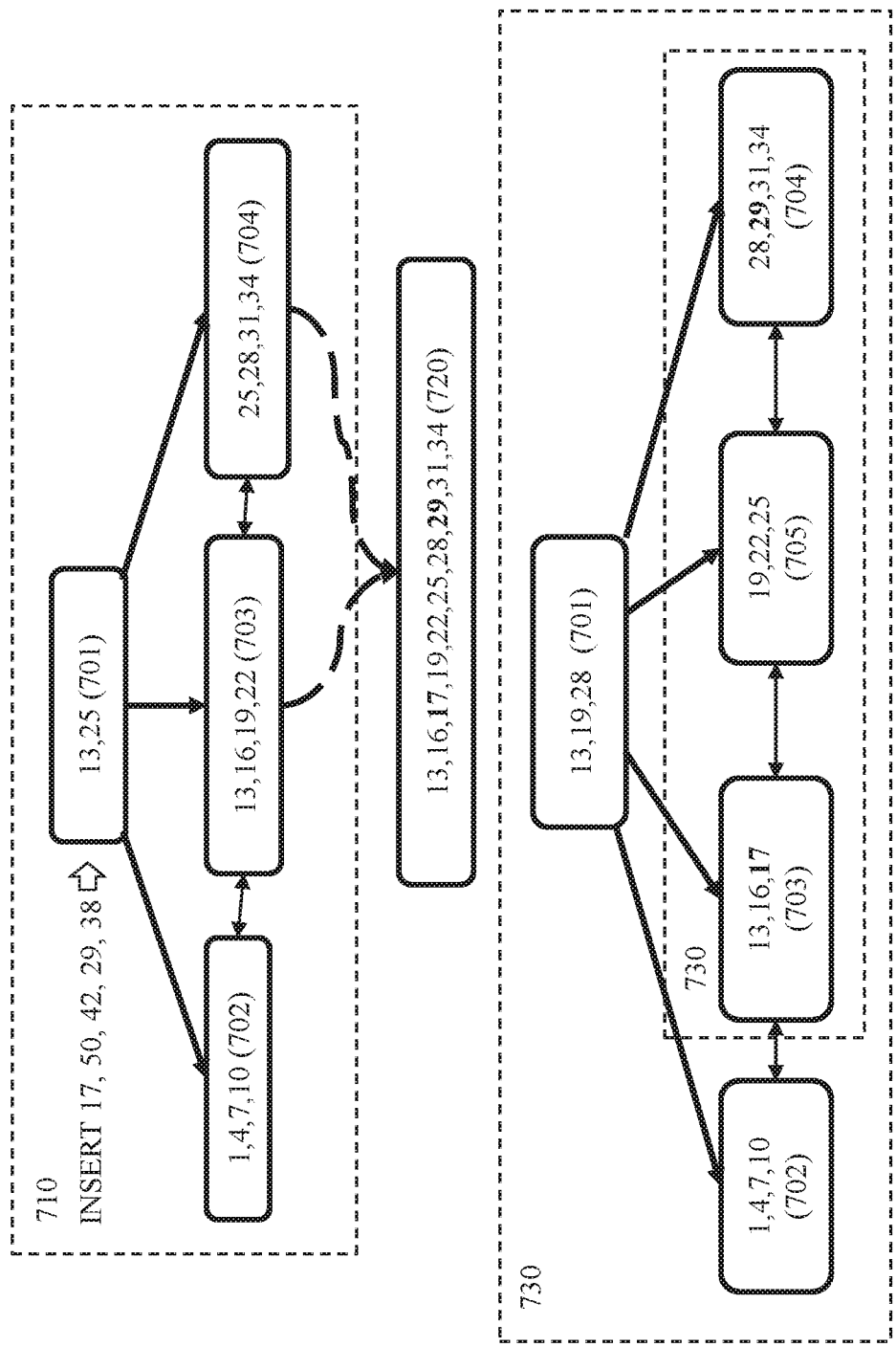
FIG. 7 depicts a partial B+ tree structure of a second example index and its corresponding split B+ tree structure of the second example index when inserting a plurality of keys into the second example index according to an embodiment of the present disclosure.

Now another scenario is considered, in which a second request to insert a plurality of keys into an index B+ tree of the table is received. FIG. 7 depicts a partial B+ tree structure 710 of a second example index and its corresponding split B+ tree structure 730 of the second example index when inserting a plurality of keys with values of {17, 50, 42, 29, 38} into the second example index according to an embodiment of the present disclosure. As shown in FIG. 7, if the method 500 is used to insert the plurality of keys, a first key with a value of 17 of the plurality of keys can be inserted first. It is assumed that the at least one sibling leaf page of the first leaf page in the key-ordered chain comprises merely one leaf page 704. Page split for the leaf page 703, as well as key redistribution, may be executed for the first time. Because keys with values of 50 and 42 are not to be inserted in the partial B+ tree structure 710, their detailed insertion process is omitted here. When the key with a value of 29 is inserted into the leaf page 704, keys redistribution may be executed for the second time. If the method 500 is used in the example index of FIG. 7, page split occurs once, and keys redistribution occurs twice.

Figure 8:
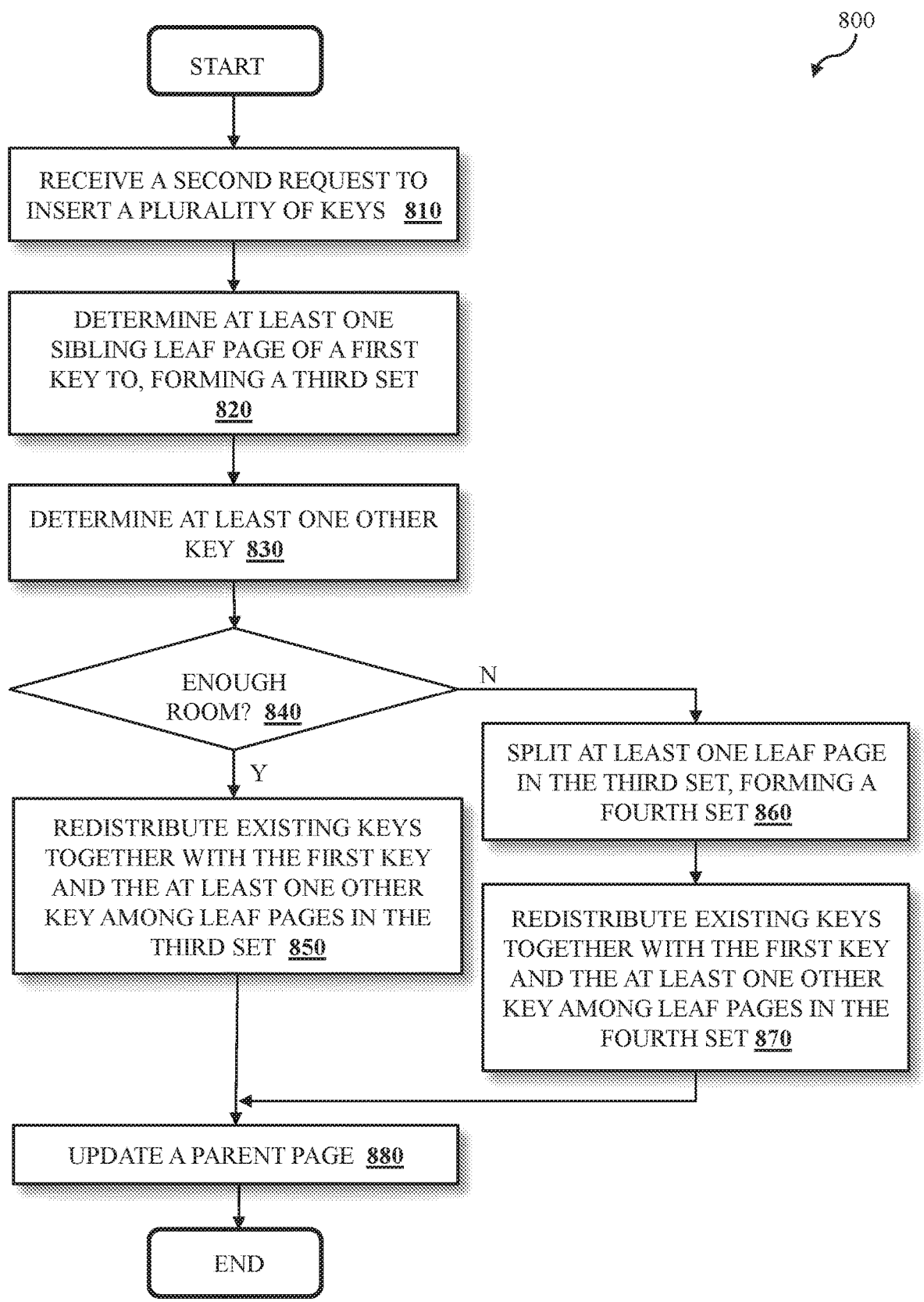
FIG. 8 depicts a schematic flowchart of a method for inserting a plurality of keys to the index pages of the database according to an embodiment of the present disclosure.

FIG. 8 depicts a schematic flowchart for inserting a plurality of keys to the index pages of the database according to an embodiment of the present disclosure. The implementation of the method 800 is specifically described in conjunction with FIG. 7.

Referring to FIG. 8, at step 810, a second request is received to store a plurality of keys to the index pages of the database, wherein the plurality of keys are to be stored into a plurality of leaf pages of the key-ordered chain of the index pages, and wherein a first leaf page corresponding to a first key of the plurality of keys is in memory and there is no room in the first leaf page to store the first key. In the second request, keys with values of {17, 50, 42, 29, 38} are to be inserted into the partial B+ tree structure 710 as indicated in FIG. 7. To fulfill the second request, a first key with a value of 17 is to be inserted into the leaf page 703. However, the leaf page 703 has no empty slots for inserting the first key. It can be understood that the first key with the value of 17 can be inserted into the leaf page 703 using the method 500.

At step 820, at least one sibling leaf page of the first leaf page in the key-ordered chain can be determined, wherein the first leaf page and the at least one sibling leaf page of the first leaf page can be regarded to form a third set. The implementation of the step 820 is similar to the step 520 in FIG. 5. It is assumed that leaf pages 704 are determined to be the at least one sibling leaf page of the leaf page 703 in FIG. 7. A third set comprising the leaf pages 703 and 704 is formed.

At step 830, at least one key from the plurality of keys to be stored into leaf pages in the third set can be determined. In some embodiments, all keys in the plurality of keys to be inserted can be searched one by one to find the at least one key. In some embodiments, the plurality of keys can be sorted in order to determine the at least one key. The plurality of keys can be sorted according to the key value order used in the key-ordered chain of index pages and a key at a first position in sorted keys can be determined to be the first key. For example, the partial B+ tree structure 710 is organized in ascending key value order in its key-ordered chain of index pages, then the plurality of keys can also be sorted in ascending key order in value as a list {17, 29, 38, 42, 50}. A key at a first position in sorted keys is the first key, e.g. the value of the first key is 17. The determination of the at least one key can be based on the above sorted list. The key with a value of 29 is determined firstly to be one of the at least one key as it is to be inserted into the leaf page 704 which is one of the at least one sibling leaf page of the leaf page 703. When the next key with a value of 50 is determined not to be one of the at least one key, the determination is stopped. In this way, the at least one key can be determined to comprise the keys with values of 17 and 29.

At step 840, whether there is enough room in all leaf pages in the third set to store existing keys in all leaf pages in the third set together with the at least one key can be determined. As shown in the partial B+ tree structure 710 in FIG. 7, the number of slots for leaf pages in the third set is 2*4=8, less than ten keys with values of {13, 16, 17, 19, 22, 25, 28, 29, 31, 34} to be redistributed, contained in block 720.

At step 850, responsive to determining that there is enough room in all leaf pages in the third set to store the existing keys in all leaf pages in the third set together with the at least one key, the existing keys in all leaf pages in the third set together with the at least one key can be stored by redistributing the existing keys in all leaf pages in the third set together with the at least one key among all leaf pages in the third set according to the redistribution policy without page splits. The implementation of the step 850 is similar to the step 540 in FIG. 5, the detailed implementation is omitted herein. After the keys are redistributed, the method 800 goes to step 880.

At step 860, responsive to determining that there is not enough room in all leaf pages in the third set to store the existing keys in all leaf pages in the third set together with the at least one key, at least one leaf page in the second set can be split into split leaf pages, the split leaf pages and all leaf pages except the at least one leaf page in the third set can be regarded to form a fourth set in order for there to be enough room in all leaf pages in the fourth set to store the existing keys in all leaf pages in the third set together with the at least one key. As shown in FIG. 7, the leaf page 703 of the partial B+ tree structure 710 are split into two leaf pages 703 and 705 of the split partial B+ tree structure 730. The detailed implementation is similar to the step 550.

At step 870, the existing keys in all leaf pages in the third set together with the at least one key can be stored by the existing keys in all leaf pages in the third set together with the at least one key among all leaf pages in the fourth set according to the redistribution policy. The detailed implementation is similar to the step 560 in FIG. 5. It can be found that if the method 800 is used in the example index of FIG. 7, a page split occurs once, and key redistribution occurs once. It can be noticed that the performance of the DBMS is further improved by using the method 800 compared with the method 500. On the contrary, if existing methods of page splits are used in this scenario, page splits would occur twice. In the first time, the leaf page 703 is split which need one synchronize I/O operation. In the second time, the leaf page 704 is split which need another synchronize I/O operation. Therefore, embodiments of the method 800 reduce page split frequency compared with the existing technology.

In some embodiments, if each of at least one key need page splits, the page splits can be executed together in the step 870, then only one synchronize I/O operation is needed, which can reduce the cost of index management.

At step 880, keys and pointers stored in a parent page of the first leaf page can be updated. As indicated in the B+ tree structure 730 in FIG. 7, the leaf page 701-1 is updated to store keys 13, 19 and 28 in addition to pointers pointing leaf pages 702-1, 703-1 and 705-1 respectively.

Figure 9:
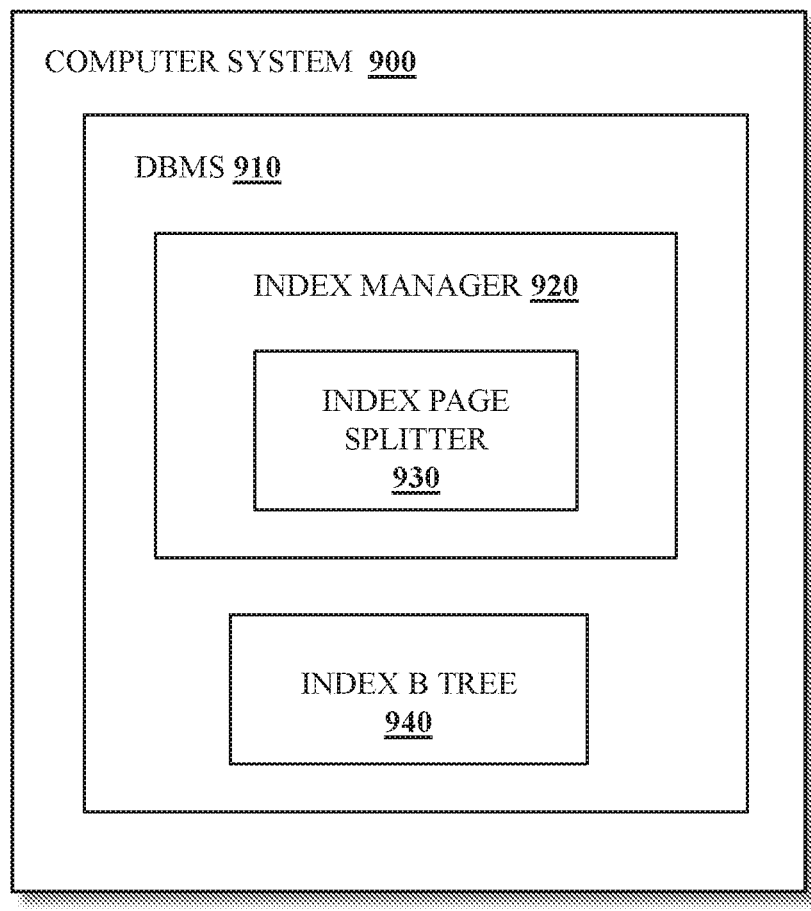
FIG. 9 depicts a block diagram of a computer system comprising an index manager according to an embodiment of the present disclosure.

FIG. 9 depicts a block diagram of a computer system 900 comprising an index manager 920 according to an embodiment of the present disclosure. The index manager 920 is implemented in a data base management system (DBMS) 910. The index manager accesses an index B-tree 940 and implements the methods 500 and 800 in conjunction with an index page splitter 930. It can be understood that the index page splitter 930 can be a component outside of the index manager 920.

It should be noted that the processing of index manager according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by one or more processors, a first request to store a specific key to index pages of a database, wherein:
  the request indicates that the specific key is to be stored to a specific leaf page in a key-ordered chain of the index pages;
  the specific leaf page is in memory; and
  there is insufficient room in the specific leaf page to store the specific key;
determining, by one or more processors, at least one sibling leaf page of the specific leaf page in the key-ordered chain, the specific leaf page and the at least one sibling leaf page forming a first set;
determining, by one or more processors, that there is enough room in the first set to store existing keys in the first set and the specific key; and
responsive to determining that there is enough room, storing, by one or more processors, the existing keys in the first set and the specific key to the first set by redistributing the existing keys in the first set and the specific key among the leaf pages of the first set such that, within the first set, a higher access frequency leaf page stores fewer keys than a lower access frequency leaf page.

2. The method of claim 1, wherein the at least one sibling leaf page (i) shares a parent page with the specific leaf page, (ii) is in memory, and (iii) is unlocked.

3. The method of claim 1, further comprising:
receiving, by one or more processors, a second request to store a first key to index pages of the database, wherein the request indicates that the first key is to be stored to the specific leaf page; and
responsive to determining that there is not enough room in the leaf pages in the first set to store the existing keys in the leaf pages in the first set together with the first key:
  splitting, by one or more processors, one leaf page in the first set into two leaf pages, the two leaf pages and the leaf pages excluding the one leaf page of the first set forming a second set; and
  storing, by one or more processors, the existing keys in the leaf pages of the first set together with the first key by redistributing the existing keys in the leaf pages of the first set together with the first key among the leaf pages of the second set such that, within the second set, a higher access frequency leaf page stores fewer keys than a lower access frequency leaf page.

4. The method of claim 1, further comprising:
updating, by one or more processors, keys and pointers stored in a parent page of the specific leaf page.

5. The method of claim 1, further comprising:
receiving, by one or more processors, a second request to store a plurality of keys to index pages of a database, wherein:
  the plurality of keys are to be stored into a plurality of leaf pages of the key-ordered chain of the index pages;
  a first leaf page corresponding to a first key of the plurality of keys is in memory; and
  there is insufficient room in the first leaf page to store the first key;
determining, by one or more processors, at least one sibling leaf page of the first leaf page in the key-ordered chain, the first leaf page and the at least one sibling leaf page of the first leaf page forming a second set;
determining, by one or more processors, at least one key from the plurality of keys to be stored into a leaf page of a third set;
determining, by one or more processors, that there is enough room in the leaf pages of the third set to store existing keys in the leaf pages of the third set together with the at least one key; and
responsive to determining that there is enough room in the leaf pages in the third set to store the existing keys in the leaf pages of the third set together with the at least one key, storing, by one or more processors, the existing keys in the leaf pages of the third set together with the at least one key by redistributing the existing keys in the leaf pages of the third set together with the at least one key among the leaf pages of the third set such that, within the third set, a higher access frequency leaf page stores fewer keys than a lower access frequency leaf page.

6. The method of claim 5, further comprising:
prior to storing the plurality of keys into the plurality of leaf pages, sorting, by one or more processors, the plurality of keys based on key values; and
determining, by one or more processors, a key at a first position in the sorted keys to be the first key.

7. A computer program product, comprising:
one or more computer readable storage media and program instructions stored on the one or more computer readable storage media, the program instructions comprising:
program instructions to receive a first request to store a specific key to index pages of a database, wherein:
  the request indicates that the specific key is to be stored to a specific leaf page in a key-ordered chain of the index pages;
  the specific leaf page is in memory; and
  there is insufficient room in the specific leaf page to store the specific key;

program instructions to determine at least one sibling leaf page of the specific leaf page in the key-ordered chain, the specific leaf page and the at least one sibling leaf page forming a first set;

program instructions to determine that there is enough room in the first set to store existing keys in the first set and the specific key; and responsive to determining that there is enough room, program instructions to store the existing keys in the first set and the specific key to the first set by redistributing the existing keys in the first set and the specific key among the leaf pages of the first set such that, within the first set, a higher access frequency leaf page stores fewer keys than a lower access frequency leaf page.

8. The computer program product of claim 7, wherein the at least one sibling leaf page (i) shares a parent page with the specific leaf page, (ii) is in memory, and (iii) is unlocked.

9. The computer program product of claim 7, further comprising:

program instructions, stored on the one or more computer readable storage media, to receive a second request to store a first key to index pages of the database, wherein the request indicates that the first key is to be stored to the specific leaf page; and responsive to determining that there is not enough room in the leaf pages in the first set to store the existing keys in the leaf pages in the first set together with the first key:

program instructions, stored on the one or more computer readable storage media, to split one leaf page in the first set into two leaf pages, the two leaf pages and the leaf pages excluding the one leaf page of the first set forming a second set; and program instructions, stored on the one or more computer readable storage media, to store the existing keys in the leaf pages of the first set together with the first key by redistributing the existing keys in the leaf pages of the first set together with the first key among the leaf pages of the second set such that, within the second set, a higher access frequency leaf page stores fewer keys than a lower access frequency leaf page.

10. The computer program product of claim 7, further comprising:

program instructions, stored on the one or more computer readable storage media, to update keys and pointers stored in a parent page of the specific leaf page.

11. The computer program product of claim 7, further comprising:

program instructions, stored on the one or more computer readable storage media, to receive a second request to store a plurality of keys to index pages of a database, wherein:

the plurality of keys are to be stored into a plurality of leaf pages of the key-ordered chain of the index pages;

a first leaf page corresponding to a first key of the plurality of keys is in memory; and there is insufficient room in the first leaf page to store the first key;

program instructions, stored on the one or more computer readable storage media, to determine at least one sibling leaf page of the first leaf page in the key-ordered chain, the first leaf page and the at least one sibling leaf page of the first leaf page forming a second set;

program instructions, stored on the one or more computer readable storage media, to determine at least one key from the plurality of keys to be stored into a leaf page of a third set;

program instructions, stored on the one or more computer readable storage media, to determine that there is enough room in the leaf pages of the third set to store existing keys in the leaf pages of the third set together with the at least one key; and responsive to determining that there is enough room in the leaf pages in the third set to store the existing keys in the leaf pages of the third set together with the at least one key, program instructions, stored on the one or more computer readable storage media, to store the existing keys in the leaf pages of the third set together with the at least one key by redistributing the existing keys in the leaf pages of the third set together with the at least one key among the leaf pages of the third set such that, within the third set, a higher access frequency leaf page stores fewer keys than a lower access frequency leaf page.

12. The computer program product of claim 11, further comprising:

program instructions, stored on the one or more computer readable storage media, to, prior to storing the plurality of keys into the plurality of leaf pages, sort the plurality of keys based on key values; and program instructions, stored on the one or more computer readable storage media, to determine a key at a first position in the sorted keys to be the first key.

13. A computer system, comprising:

one or more computer processors, one or more readable storage media, and program instructions stored on the one or more computer readable storage media for execution by at least one of the one or more computer processors, the program instructions comprising:

program instructions to receive a first request to store a specific key to index pages of a database, wherein:

the request indicates that the specific key is to be stored to a specific leaf page in a key-ordered chain of the index pages;

the specific leaf page is in memory; and there is insufficient room in the specific leaf page to store the specific key;

program instructions to determine at least one sibling leaf page of the specific leaf page in the key-ordered chain, the specific leaf page and the at least one sibling leaf page forming a first set;

program instructions to determine that there is enough room in the first set to store existing keys in the first set and the specific key; and responsive to determining that there is enough room, program instructions to store the existing keys in the first set and the specific key to the first set by redistributing the existing keys in the first set and the specific key among the leaf pages of the first set such that, within the first set, a higher access frequency leaf page stores fewer keys than a lower access frequency leaf page.

14. The computer system of claim 13, wherein the at least one sibling leaf page (i) shares a parent page with the specific leaf page, (ii) is in memory, and (iii) is unlocked.

15. The computer system of claim 13, further comprising:

program instructions, stored on the one or more computer readable storage media for execution by at least one of the one or more computer processors, to receive a second request to store a first key to index pages of the database, wherein the request indicates that the first key is to be stored to the specific leaf page; and responsive to determining that there is not enough room in the leaf pages in the first set to store the existing keys in the leaf pages in the first set together with the first key:

program instructions, stored on the one or more computer readable storage media for execution by at least one of the one or more computer processors, to split one leaf page in the first set into two leaf pages, the two leaf pages and the leaf pages excluding the one leaf page of the first set forming a second set; and program instructions, stored on the one or more computer readable storage media for execution by at least one of the one or more computer processors, to store the existing keys in the leaf pages of the first set together with the first key by redistributing the existing keys in the leaf pages of the first set together with the first key among the leaf pages of the second set such that, within the second set, a higher access frequency leaf page stores fewer keys than a lower access frequency leaf page.

16. The computer system of claim 13, further comprising:
program instructions, stored on the one or more computer readable storage media for execution by at least one of the one or more computer processors, to update keys and pointers stored in a parent page of the specific leaf page.

17. The computer system of claim 13, further comprising:
program instructions, stored on the one or more computer readable storage media for execution by at least one of the one or more computer processors, to receive a second request to store a plurality of keys to index pages of a database, wherein:

the plurality of keys are to be stored into a plurality of leaf pages of the key-ordered chain of the index pages;

a first leaf page corresponding to a first key of the plurality of keys is in memory; and there is insufficient room in the first leaf page to store the first key;

program instructions, stored on the one or more computer readable storage media for execution by at least one of the one or more computer processors, to determine at least one sibling leaf page of the first leaf page in the key-ordered chain, the first leaf page and the at least one sibling leaf page of the first leaf page forming a second set;

program instructions, stored on the one or more computer readable storage media for execution by at least one of the one or more computer processors, to determine at least one key from the plurality of keys to be stored into a leaf page of a third set;

program instructions, stored on the one or more computer readable storage media for execution by at least one of the one or more computer processors, to determine that there is enough room in the leaf pages of the third set to store existing keys in the leaf pages of the third set together with the at least one key; and responsive to determining that there is enough room in the leaf pages in the third set to store the existing keys in the leaf pages of the third set together with the at least one key, program instructions, stored on the one or more computer readable storage media for execution by at least one of the one or more computer processors, to store the existing keys in the leaf pages of the third set together with the at least one key by redistributing the existing keys in the leaf pages of the third set together with the at least one key among the leaf pages of the third set such that, within the third set, a higher access frequency leaf page stores fewer keys than a lower access frequency leaf page.

\* \* \* \* \*